(12) United States Patent
Crandall et al.

(10) Patent No.: US 10,159,181 B2
(45) Date of Patent: Dec. 25, 2018

(54) AUTOMATED SECURE DOOR FOR ROBOTIC MOWER

(71) Applicants: Justin Crandall, Dallas, TX (US); Bart M. Lomont, Dallas, TX (US); David J. Melbourne, Arlington, TX (US)

(72) Inventors: Justin Crandall, Dallas, TX (US); Bart M. Lomont, Dallas, TX (US); David J. Melbourne, Arlington, TX (US)

(73) Assignee: Robin Technologies, Inc., Dallas, TX (US)

(*) Notice: Subject to any disclaimer, the term of this patent is extended or adjusted under 35 U.S.C. 154(b) by 0 days.

(21) Appl. No.: 15/886,805

(22) Filed: Feb. 1, 2018

(65) Prior Publication Data
US 2018/0213719 A1 Aug. 2, 2018

Related U.S. Application Data

(60) Provisional application No. 62/453,644, filed on Feb. 2, 2017.

(51) Int. Cl.
A01D 34/00 (2006.01)
A01B 69/04 (2006.01)
A01B 79/00 (2006.01)
A01D 101/00 (2006.01)

(52) U.S. Cl.
CPC .......... *A01D 34/008* (2013.01); *A01B 69/008* (2013.01); *A01B 79/005* (2013.01); *A01D 2101/00* (2013.01); *G05D 2201/0208* (2013.01)

(58) Field of Classification Search
CPC .......... A01D 34/008; A01D 2101/00; A01B 79/005; A01B 69/008; G05D 2201/0208; E06B 7/32; E06B 11/022; E05B 47/0001; E05B 65/06; E05B 2047/0072; G07C 9/00309; G07C 2009/00769
See application file for complete search history.

(56) References Cited

U.S. PATENT DOCUMENTS

| | | | |
|---|---|---|---|
| 5,177,900 A * | 1/1993 | Solowiej | A01K 1/035 49/25 |
| 6,326,754 B1 * | 12/2001 | Mullet | G07C 9/00182 318/266 |
| 6,443,509 B1 * | 9/2002 | Levin | A01D 34/008 200/61.43 |

(Continued)

*Primary Examiner* — Brian E Miller
(74) *Attorney, Agent, or Firm* — Dan Brown Law Office; Daniel R. Brown

(57) ABSTRACT

A doorway system for a robotic vehicle that accesses a separated area through a barrier that has a doorway formed through it. The system includes a wireless transmitter that transmits an electronic signal from the robotic vehicle, and a door movably disposed within the doorway, between a closed position and an open position. A doorway device with a wireless receiver that is coupled to a locking mechanism is configured to selectively engage and lock the door at the closed position, and unlock the door upon receipt of the electronic signal by the wireless receiver. Movement of the robotic vehicle toward the doorway device enables communication of the electronic signal from the wireless transmitter to the wireless receiver. Upon passage of the robotic vehicle through the doorway to the separated area, and return of the door to the closed position, the controller controls the locking mechanism to engage and lock the door.

12 Claims, 2 Drawing Sheets

(56) References Cited

U.S. PATENT DOCUMENTS

| | | | | |
|---|---|---|---|---|
| 7,178,289 B2* | 2/2007 | Gierl | E05F 15/42 | 49/197 |
| 7,511,626 B2* | 3/2009 | Siegmann | B66B 1/468 | 119/484 |
| 7,668,631 B2* | 2/2010 | Bernini | A01B 69/008 | 180/168 |
| 8,239,992 B2* | 8/2012 | Schnittman | A47L 11/34 | 15/41.1 |
| 8,336,282 B2* | 12/2012 | Messina | A01D 34/008 | 56/320.1 |
| 8,374,721 B2* | 2/2013 | Halloran | A47L 5/30 | 700/245 |
| 9,003,705 B1* | 4/2015 | Solowiej | E06B 7/32 | 49/169 |
| 9,284,773 B1* | 3/2016 | Fridley | E06B 7/32 | |
| 9,955,671 B1* | 5/2018 | Turocy | A01K 15/021 | |
| 2003/0167693 A1* | 9/2003 | Mainini | E05B 47/0012 | 49/28 |
| 2005/0252622 A1* | 11/2005 | Reid | E06B 7/32 | 160/180 |
| 2005/0284402 A1* | 12/2005 | Becker | E06B 7/32 | 119/484 |
| 2007/0137584 A1* | 6/2007 | Travis | A01K 5/02 | 119/51.02 |
| 2008/0041665 A1* | 2/2008 | Siegmann | B66B 1/468 | 187/247 |
| 2008/0156274 A1* | 7/2008 | Andrade | A01K 1/0017 | 119/484 |
| 2008/0184940 A1* | 8/2008 | Bosserdet | E06B 7/32 | 119/484 |
| 2008/0284596 A1* | 11/2008 | Montague | E06B 9/01 | 340/545.8 |
| 2009/0044760 A1* | 2/2009 | Kodat | A01K 15/02 | 119/719 |
| 2014/0365258 A1* | 12/2014 | Vestal | G06Q 10/063114 | 705/7.15 |
| 2015/0350848 A1* | 12/2015 | Eramian | H04W 4/90 | 455/404.2 |
| 2016/0186485 A1* | 6/2016 | Taylor | E06B 7/32 | 49/25 |
| 2017/0140646 A1* | 5/2017 | Lu | G08B 21/18 | |
| 2017/0202186 A1* | 7/2017 | Bonge, Jr. | A01K 27/009 | |

* cited by examiner

AUTOMATED SECURE DOOR FOR ROBOTIC MOWER

BACKGROUND OF THE INVENTION

Related Applications

None.

Field of the Invention

The present invention relates to selective vehicular access of doorways in physical barriers. More particularly, the present invention relates to doorway devices that selectively allow robotic lawnmowers, or similar vehicles, to pass through a physical barrier, such as a fence, while preventing the passage of people, animals, debris and etc.

Description of the Related Art

In some housing or business developments, a properly kept lawn is a requirement, and can increase property values. Maintaining a grass lawn requires frequent mowing. Lawn mowing has traditionally been conducted using various types of powered and unpowered lawnmowers. In recent years, robotic mower use has been on the increase by homeowners, renters, government entities, business owners, and property owners. Robotic lawnmowers, also called robotic mowers, automatically mow one or more sections, or areas, of a grass lawn. Such robotic mowers are directed by various guidance systems and are programmable according to certain mowing schedules, functions, and designated grass areas. A problem exists where the various sections of lawn are separated by physical barriers, which may take various forms, including fences. The robotic mowers are unable to pass through these barriers without some form of access assistance, such as a human creating an access through the barrier. While robotic mowers are designed to operate in various areas and along various pathways, a system for selectively allowing a robotic mower to pass through a barrier while preventing animals, debris or intruders from passing through the barrier does not exist. Thus, is can be appreciated that there is a need in the art for systems and methods for addressing the problems in the prior art.

SUMMARY OF THE INVENTION

The present disclosure teaches a doorway system for a robotic vehicle that accesses a separated area through a barrier that has a doorway formed through it. The system includes a wireless transmitter that transmits an electronic signal from the robotic vehicle, and a door movably disposed within the doorway, between a closed position and an open position. A doorway device is coupled to the barrier adjacent to the door, with a wireless receiver coupled to a controller that is coupled to a locking mechanism configured to selectively engage and lock the door at the closed position, and that operates to unlock the door upon receipt of the electronic signal by the wireless receiver. Movement of the robotic vehicle toward the doorway device enables communication of the electronic signal from the wireless transmitter to the wireless receiver such that the controller unlocks the door to thereby enable movement of the door to the open position. Upon passage of the robotic vehicle through the doorway to the separated area, and return of the door to the closed position, the controller controls the locking mechanism to engage and lock the door.

In a specific embodiment of the foregoing system, wherein the robotic vehicle is a lawn mower that follows a predetermined pathway defined by buried electrical conductors, plural separated electrical conductors pass through the doorway, and the doorway and the door have a width sufficient accommodate the spacing of plural electrical conductor in addition to the robotic mower.

In a specific embodiment of the foregoing system, the electronic signal is an infrared signal transmitted continuously, which has an effective range of five to ten feet. In another specific embodiment, the electronic signal comprises plural directional electronic signal, which have an angular orientation between fifteen degrees and thirty degrees with respect to said wireless receiver.

In a specific embodiment of the foregoing system, the door is a swinging door with a horizontal hinge located at a top of the doorway, and the robotic vehicle pushes the door open during passage through the door, and the door returns to the closed position under force of gravity. In a refinement to this embodiment, a magnet is disposed between the door and the doorway device to cooperatively assist gravity to encourage the door towards the closed position.

In a specific embodiment of the foregoing system, the locking mechanism further includes a longitudinally translated pin positionable between a retracted position to unlock the door, and an extended position to lock the door, and the longitudinally translated pin is retracted and extended by a solenoid or a motor. In another specific embodiment, the system further includes a Hall effect sensor positioned adjacent to the door to provide a position signal to the controller so as to confirm the door is at the closed position.

In a specific embodiment of the foregoing system, the door is is externally powered, and is rotatably or slidably moved out of the path of the robotic vehicle upon receipt of the electronic signal by the doorway device.

The present disclosure also teaches a method of controlling access to a separated area by a robotic vehicle through a barrier that has a doorway formed therethrough where a door is movably disposed within the doorway, between a closed position and an open position, and using a doorway device coupled to the barrier adjacent the door, having a wireless receiver coupled to a locking mechanism for selectively engaging and locking the door at the closed position, and selectively unlocking the door in response to receiving the electronic signal. The method includes moving the robotic vehicle toward the doorway device, thereby enabling communications of electronic signals to the wireless receiver, and transmitting an electronic signal from the robotic vehicle using a wireless transmitter. Then, unlocking the door by the unlocking mechanism in response to receiving the electronic signal, thereby enabling movement of the door to the open position. Next passing the robotic vehicle through the doorway to the separated area, returning the door to the closed position, and engaging and locking the door by the locking mechanism after the robotic vehicle as passed through the doorway.

In a specific embodiment, the foregoing method further includes delaying a predetermined period of time prior to engaging and locking the door. In another embodiment, wherein the robotic vehicle is a lawn mower that follows a predetermined pathway defined by buried electrical conductors, the method further includes routing plural separated electrical conductors through the doorway, and selecting a width of the doorway and door sufficient for accommodating the spacing of plural electrical conductor in addition to the robotic law mower.

In a specific embodiment of the foregoing method, wherein the electronic signal is an infrared signal having an effective range to five to ten feet, the method further includes transmitting the electronic signal continuously. In another embodiment, the electronic signal comprises plural directional electronic signal, which have an angular orientation between fifteen degrees and thirty degrees with respect to the wireless receiver.

In a specific embodiment of the foregoing method, wherein the door is a swinging door with a horizontal hinge located at a top of the doorway, the method further includes pushing the door open by the robotic vehicle while passing through the door, and returning the door to the closed position under force of gravity. In another embodiment, wherein a magnet is disposed between the door and the doorway device, the method further includes cooperatively assisting gravity, by the magnet, thereby to encouraging the door towards the closed position.

In a specific embodiment of the foregoing method, wherein the locking mechanism includes a longitudinally translated pin positionable between a retracted position to unlock the door, and an extended position to lock the door, the method further includes retracting and extending the longitudinally translated pin using a solenoid or a motor. In another embodiment, a Hall effect sensor is positioned adjacent the door, and the method further includes providing a position signal to confirm the door is at the closed position.

DESCRIPTION OF THE INVENTION

Figure 1:
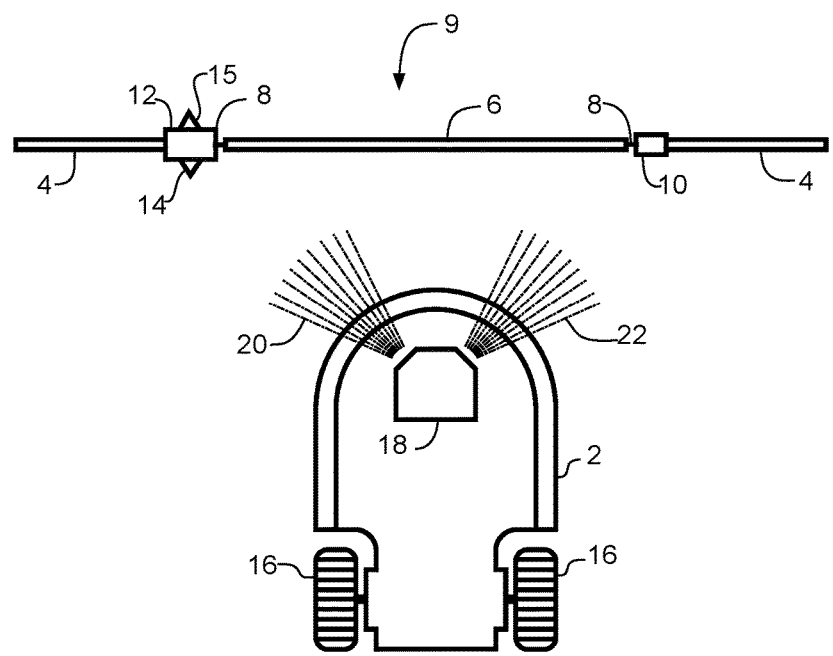
FIG. 1 is an overhead drawing of a robotic mower accessing a doorway in a barrier according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

In the following detailed description, numerous specific details are set forth to provide a full understanding of the present disclosure. It will be obvious, however, to one ordinarily skilled in the art that the implementations of the present disclosure may be practiced without some of these specific details. In other instances, well-known structures and techniques have not been described in detail to avoid obscuring the disclosure.

A need exists for a system and method for selectively allowing a robotic lawnmower, also referred to as a robotic mower, to pass through a barrier while preventing animals, debris or intruders from passing through the barrier. More generically speaking, the robotic mower can be referred to as a vehicle, which is consistent with implementations of the present teachings in other vehicular applications. In certain illustrative embodiments of the present teachings, a doorway device is provided for use in conjunction with a door in a doorway through a barrier. The doorway device communicates with a vehicle, selectively unlocks a door to allow the vehicle to pass through the doorway, and the doorway device locks the door after the vehicle has passed through the doorway. In an illustrative embodiment, the vehicle is a robotic lawnmower, or a robotic mower, which operates autonomously, according to a pre-set route or according to remote control. The robotic mower may be powered by electric motors and propelled by wheels and/or tracks. The vehicle may also be of other types of self-propelled vehicles, such as a robotic vacuum cleaners, or transportation vehicles for humans or cargo.

The barrier discussed herein may be a fence, a wall, a door or other type of obstacle. An automated doorway system of the present disclosure allows free movement of the vehicle between different areas separated by barriers, thus enabling the vehicle to access remote grass areas, multiple grass areas, in addition to accessing charging stations and storage spaces. Absent the teachings of this disclosure, an operator would be required to manually relocate the robotic mower from area to area to allow access to areas separated by barriers. This would be physically challenging, time-consuming, and forces the robotic mower to rely on the availability of an operator.

In an illustrative embodiment, the vehicle communicates with the doorway device using a wireless communication system. When viewed at the system level, an automated doorway system operates in conjunction with a door in a doorway, and includes the doorway device, the vehicle, and a wireless receiver that is disposed on one of the doorway device or the vehicle while a wireless transmitter is disposed on the other of the doorway device or the vehicle.

In an illustrative embodiment, the wireless transmitter is mounted on the vehicle and transmits an electronic signal to the wireless receiver mounted in the doorway device. Upon receipt of the electronic signal, the wireless receiver instructs a controller in the doorway device to actuate a locking mechanism that retracts a pin, which disengages the door, thereby unlocking the door, and enabling the vehicle to pass through the doorway. This process will be described in greater detail hereinafter. The wireless communication system may use any of several available communications protocols, including, Bluetooth technology, infrared signals, ultrasonic signals, radio signals, Radio Frequency Identification (RFID), optical signals, video signals, or other electronic signals known to those skilled in the art, for communication between a wireless receiver and a wireless transmitter. When mounted on the vehicle, the wireless transmitter may be powered by a main vehicle battery or an auxiliary battery. When mounted in the doorway device, the wireless receiver may be powered by a removable auxiliary battery, a stationary high-capacity battery, or a central power grid.

In an illustrative embodiment, when the vehicle approaches the doorway device, one or more wireless transmitters on the vehicle transmits an electronic signal to the wireless receiver in the doorway device. The wireless transmitters may successfully send a wireless signal that is received by the wireless receiver at a certain maximum distance, which may be approximately 5-10 feet. Further, the wireless transmitter may successfully send a wireless signal that is received by the wireless receiver when the wireless transmitter is oriented within a particular angular orientation range relative to the wireless receiver, which may be approximately 15 or 30 degrees. One or both of the wireless receiver and wireless transmitter may be always receiving/transmitting, respectively, or may be periodically receiving/transmitting, respectively.

In an illustrative embodiment, the robotic mower operates according to pathways and areas defined by wires or communication devices embedded in the ground. In an illustrative embodiment, the robotic mower operates autonomously and incorporates programmable features and operational inputs.

In an illustrative embodiment, the doorway device includes a wireless receiver, a locking mechanism, a controller, and a battery. The locking mechanism includes a selectively positionable pin. In an unlocked position, the pin is retracted by the locking mechanism and does not interfere with operation of a door. The door may be a swinging door, or door with a hinge coupled at the top of the doorway. In a locked position, the pin is extended by the locking mechanism and is inserted into a pin receptacle in the door, thus preventing movement of the door away from a closed position. In an illustrative embodiment, the pin is longitudinally translated between the locked and unlocked, or extended and retracted, positions by a solenoid or an electric motor within the locking mechanism. A distal end of the pin, which first enters the pin receptacle in the door, may include a rounded, conical, pyramidal, pointed or frustum shaped to aid the insertion of the pin into the pin receptacle. Additionally, in the case of the door being a swinging door with a hinge connection between the door and the doorway located at the top of doorway, magnets may be disposed between the door and the doorway device that cooperatively encourage the door towards a vertical or closed position.

In an illustrative embodiment of operation of the foregoing system, the vehicle, operates autonomously or follows a pre-determined pathway. The vehicle approaches the doorway in the barrier having the doorway device. If the wireless transmitter on the vehicle is within range and orientation tolerances, the wireless transmitter sends an electronic wireless communication, which is received by the wireless receiver in the doorway device. Upon receipt of the electronic wireless communication, the wireless receiver signals the controller to direct the locking mechanism to retract the pin disposed in the pin receptacle in the door. As the door in the doorway is now rotationally unhindered by the pin, the vehicle proceeds through the doorway and thus through the barrier. The vehicle can pass through the doorway by driving into the door and lifting, rotating or otherwise displacing the door. Following the passage of the vehicle through the door, it is ensured that the pin is properly aligned with the pin receptacle by virtue of gravitational forces and magnetic forces between the door and the doorway device, as described elsewhere herein. A confirmation of a proper door position can be confirmed through use of a Hall effect sensor positioned adjacent to a magnet in the door and/or the doorway device. After a predetermined time period has elapsed from the wireless receiver receiving the wireless communication from the wireless transmitter, or from the vehicle passing through the doorway, the controller directs the locking mechanism to extend the pin into the pin receptacle in the door, thus re-locking the door within the doorway by the doorway device.

In an illustrative embodiment, the wireless receiver, locking mechanism, controller, battery and a door closing-sensor are located in or on the doorway or door. In such an implementation, the pin is longitudinally translated from the doorway into a pin receptacle in the doorway device, thus preventing an operation of the door. Other functionality and features of these implementations are the same as those described above in other implementations.

In an illustrative embodiment, the door is externally powered and is rotatably or slidably moved out of the path of the vehicle when the wireless communication signal is received by the wireless receiver on the doorway device. The doorway device and/or the vehicle can, in an illustrative embodiment, wirelessly communicate a current status, future plan, operational history or other information to a user, a network or a remote device using various wireless communication technologies.

In an illustrative embodiment, the vehicle follows a wire embedded in the ground. The wire may form a continuous circuit and the vehicle travels along the wire in one direction. To prevent a cancellation of signals from different portions of the wire, any one portion the wire may not be arranged within a minimum distance of any other portion of the wire. Accordingly, as the vehicle may need to travel in opposite directions through the doorway, a width of the doorway and doorway device may be wide enough to accommodate both wire portions, including at least the minimum distance between them, and provide adequate width clearance for the vehicle when the vehicle follows the wire path in each direction through the doorway.

Reference is directed to FIG. 1, which is an overhead drawing of a robotic mower 2 accessing a doorway 9 in a barrier 4 according to an illustrative embodiment of the present invention. A robotic mower 2 is pictured as it approaches a barrier 4, which is a fence in this illustrative embodiment. The robotic mower 2 is driven by a pair of wheels 16, and its path and movement are controlled as otherwise described in the present disclosure. An infrared transmitter assembly 18 is activated by the movement of the robotic mower 2 and transmits an infrared signal continuously during the mowing. Note that FIG. 1 illustrates two infrared beams 20 and 22, which transmit in certain directions, as illustrated. As the robotic mower 2 transitions from one area, which may also be referred to as a zone, to the next, it is directed towards the doorway 9. The doorway 9 is surrounded by a door frame 10 in this illustrative embodiment. A doorway device 12 is located along the door frame 10 around the periphery of the doorway 9. The doorway device 12 may also be referred to as a control, receiver, and latch assembly. The control, receiver, and latch assembly 12 receives and detects the infrared signals 20, 22, which are angled to give the most security for any pets enclosed by the fence 4. The infrared signals may also be referred to as electronic signals in generic illustrative embodiments. The control, receiver, and latch assembly 12 retracts a latch pin (item 28 in FIG. 2), which releases a gravity-fed flap door 6 allowing it to swing on its upper pivots 8.

Note in FIG. 1 that the infrared signals 20, 22 are transmitted to both left and right sides of the robotic mower 2 as it uses the door 6 bidirectionally. Each side of the control, receiver, and latch assembly 12 has either its own infrared sensor 14, 15 or a light pipe connects both sides to a single infrared receiver (not shown in FIG. 1). Using this method, only the one control, receiver, and latch assembly is required for the two sides of barrier 4. Also note, in FIG. 2, that in order to prevent wind from preventing the door from closing, powerful rare earth magnets 5, 7 are mounted in the door frame 10 and door 6, which hold the door 6 steady while it is re-latched.

Figure 2:
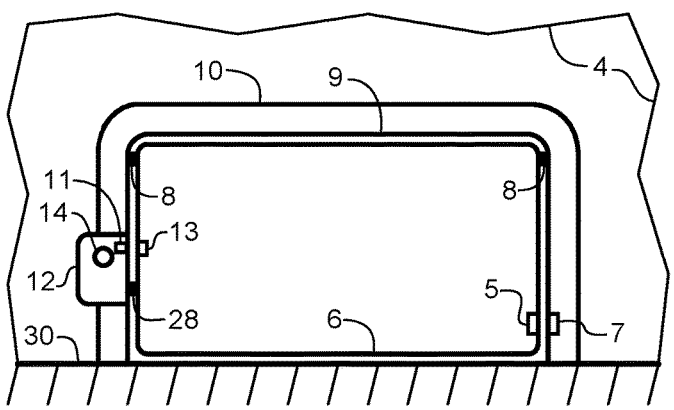
FIG. 2 is a front view drawing of a doorway in a barrier according to an illustrative embodiment of the present invention.

Reference is directed to FIG. 2, which is a front view drawing of a doorway 9 in a barrier 4 according to an illustrative embodiment of the present invention. The barrier 4 separates areas in a lawn 30 in this illustrative embodiment. The doorway 9 has a door frame 10 disposed about its periphery, however, the use of such a frame is optional. A door 6 is disposed within the doorway 9. In this illustrative embodiment, the door 6 is a swinging door with a hinge 8 connection between the door 6 and the doorway 9, located at the top of doorway 9. The doorway device 12 is also referred to as a control, receiver, and latch assembly, as noted hereinbefore. The doorway device 12 has a locking mechanism (not shown) that includes a selectively positionable pin 28. In an unlocked position, the pin 28 is retracted by the locking mechanism and does not interfere with operation of a door 6. The door 6 is a swinging door in this illustrative embodiment. In a locked position, the pin 6 is extended by the locking mechanism and is inserted into a pin receptacle (not shown) in the door 6, thus preventing movement of the door 6 away from a closed position. The doorway device 12 further includes an infrared sensor 14 disposed on its exterior surface for receiving an infrared electronic signal from the robot mower (not shown).

Figure 3:
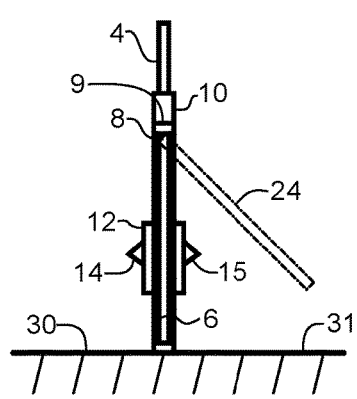
FIG. 3 is a side view drawing of a doorway in a barrier according to an illustrative embodiment of the present invention.

Reference is directed to FIG. 3, which is a side view drawing of a doorway 9 in a barrier 4 according to an illustrative embodiment of the present invention. The barrier 4 separates areas 30, 31 of the lawn. The doorway 9 has a door frame 10 disposed about its periphery. A door 6 hangs on a hinge 8 located at the top of the doorway 9. Thus, the door 6 is enabled to swing to open positions 24. Such swinging occurs when the robotic mower (not shown) traverses the doorway 9. The doorway device 12 is disposed about the doorway frame 10 in the illustrative embodiment. The doorway device 12 further includes infrared sensors 14, 15 disposed on its exterior surfaces adjacent to a first area 30 and a second area 31. The infrared sensors 14, 15 receive the aforementioned infrared electronic signal from the robotic mower (not shown).

Continuing, with respect to FIGS. 1, 2, and 3, after the robotic mower 2 has pushed the door 6 open 24 and passed through the doorway 9, the doorway device 12 control, receiver and latch system waits for the door 6 to swing back to its lowest point, under the force of gravity, at which time the doorway device 12 detects this position using an onboard Hall effect sensor 11 that is coupled to a corresponding magnet 13 in the door 6 itself. Once stable, the latch pin 28 is extended to re-latch the door 6. Since the doorway device 12 is battery powered, its operations occur in very short periods of time, with the remaining time spent in a low power, sleep, mode. Battery life is estimated at more than a year.

The doorway device 12 is a door frame 10 mounted, self-contained, weatherproof, device that comprises a controller, wireless receiver, and locking mechanism in the illustrative embodiment. The door 6 is a gravity operated bi-directional door with centering magnets in this illustrative embodiment.

While the identification aspect of the design uses infrared in this illustrative embodiment, this could be replaced with Bluetooth wireless or other wireless formats. Ultrasonics could be used for robot detection, or even video image detection. In other illustrative embodiments, the door could be power assisted, with the option that the door motion be up and down rather than the arc of the prior illustrative embodiment. The centering detection could be achieved with micro-switches. The centering stabilization could be achieved with springs also. In certain embodiments, the controller, receiver, latch software can be updated as needed and also includes the option to transmit status and operations to the user via the internet wirelessly, and/or receive commands the same way.

Figure 4:
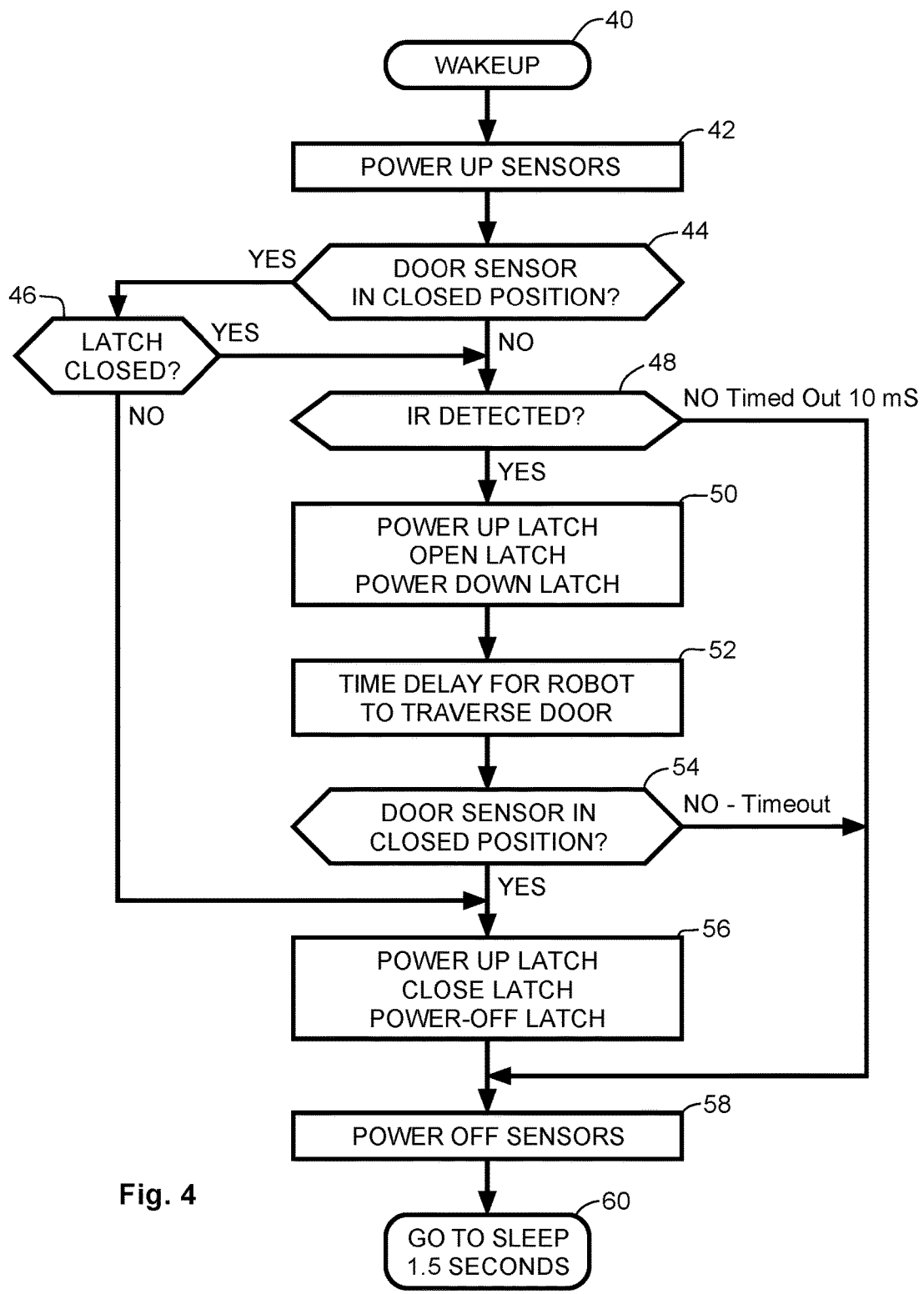
FIG. 4 is a process flow diagram of a method of accessing a doorway in a barrier by a robotic mower according to an illustrative embodiment of the present invention.

Reference is directed to FIG. 4, which is a process flow diagram of a method of accessing a doorway in a barrier by a robotic mower according to an illustrative embodiment of the present invention. The process begins at step 40 where the controller and system wakeup. At step 42, the sensors are powered up to enable their sensory functions and make that information available to the controller. At step 44 a test is conducted to determine if the door is in the closed positron not. If the door is not closed, the process proceeds to step 48. If the door is closed at step 44, then a test is conducted at step 46 to determine whether the latch is closed or not. If the latch is closed at step 46, then the process proceeds to step 48. If the latch is not closed at step 46, then the process proceeds to step 56, which will more discussed hereinafter. Having completed the door closed test and latch closed test, the process may continue to step 48.

At step 48, a test is conducted to determine whether or not an infrared signal has been detected by an infrared sensor. If no infrared is detected, after a ten millisecond time-out period, flow proceeds to step 58. On the other hand, at step 48, if an infrared signal is detected, then flow proceeds to step 50. At step 50, the controller powers up the latch to open the latch, and powers down the latch. At step 52, a time delay period is run to provide time for the robotic mower to traverse the door. At step 54, a test is conducted to determine is the door sensor detects that the door is in the closed position. If it is no, after a timeout period, then flow proceeds to step 58. On the other hand, if the door is closed at step 54, then flow proceeds to step 58. Note also that step 58 can also be reached from step 46 of the latch was not closed for that test.

At step 56, the controller powers up the latch to close the latch and powers off the latch. At step 58, the controller powers off the sensors. Note that step 58 is also reached if no infrared is detected at step 498, or if the door sensor timeout runs in step 54. After the sensors are powered off at step 58, the process continues to step 60 where the controller goes to sleep for 1.5 seconds.

The disclosed systems and methods can be implemented with a computer system known to one of ordinary skill in the art, using, for example, software, hardware, or a combination of both, either in a dedicated server, or integrated into another entity, or distributed across multiple entities. An exemplary computer system includes a bus or other communication mechanism for communicating information, and a processor coupled with the bus for processing information. The processor may be locally or remotely coupled with the bus. By way of example, the computer system may be implemented with one or more processors. The processor may be a general-purpose microprocessor, a micro controller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The computer system also includes a memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus for storing information and instructions to be executed by processor. The instructions may be implemented according to any method well known to those of skill in the art, including, but not limited to, computer languages such as data-oriented languages (e.g., SQL, dBase), system languages (e.g., C, Objective-C, C++, Assembly), architectural languages (e.g., Java), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, data flow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory may also be used for storing temporary variables or other intermediate information during execution of instructions to be executed by processor. The computer system may further include a data storage device such as a magnetic disk or optical disk, coupled to bus for storing information and instructions. The computer system may be coupled via communications module to various devices. The communications module can be any input/output module. In certain illustrative embodiments, the communications module is configured to connect to a plurality of devices, such as an input device and/or an output device.

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. One or more processors in a multi-processing arrangement may also be employed to execute the sequences of instructions contained in memory. In alternative embodiments, hard-wired circuitry may be used in place of or in combination with software instructions to implement various implementations of the present disclosure. Thus, implementations of the present disclosure are not limited to any specific combination of hardware circuitry and software. According to one aspect of the disclosure, the disclosed system can be implemented using one or many remote elements in a computer system (e.g., cloud computing), such as a processor that is remote from other elements of the exemplary computer system described above.

The term "machine-readable medium" as used herein refers to any medium or media that participates in providing instructions to the processor for execution. Such a medium may take many forms, including, but not limited to, non-volatile media, volatile media, and transmission media. Non-volatile media include, for example, optical or magnetic disks, such as a data storage device. Volatile media include dynamic memory, such as memory. Transmission media include coaxial cables, copper wire, and fiber optics, including the wires that comprise the bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

While certain aspects and implementations of the disclosure have been described, these have been presented by way of example only, and are not intended to limit the scope of the disclosure. Indeed, the novel methods and systems described herein may be embodied in a variety of other forms without departing from the spirit thereof. The accompanying claims and their equivalents are intended to cover such forms or modifications as would fall within the scope and spirit of the disclosure.

What is claimed is:

1. A doorway system for a robotic vehicle that accesses a separated area through a barrier having a doorway formed therethrough, comprising:

a wireless transmitter that transmits an electronic signal from the robotic vehicle;

a door movably disposed within the doorway, between a closed position and an open position;

a doorway device coupled to the barrier adjacent said door, having a wireless receiver coupled to a controller that is coupled to a locking mechanism configured to selectively engage and lock said door at said closed position, and operable to unlock said door upon receipt of said electronic signal by said wireless receiver, and wherein movement of the robotic vehicle toward said doorway device enables communication of said electronic signal from said wireless transmitter to said wireless receiver such that said controller unlocks said door to thereby enable movement of said door to said open position;

a magnet disposed between said door and said doorway device to encourage said door towards said closed position;

a Hall effect sensor positioned adjacent said door to provide a position signal to said controller to confirm said door is at said closed position, and wherein upon passage of said robotic vehicle through the doorway to the separated area, and return of said door to said closed position with the assistance of said magnet, and upon receipt of said position signal from said Hall effect sensor, said controller controls said locking mechanism to engage and lock said door.

2. The system of claim 1, and wherein:

said electronic signal is an infrared signal transmitted continuously, which has an effective range of five to ten feet.

3. The system of claim 1, and wherein:

said electronic signal comprises plural directional electronic signal, which have an angular orientation between fifteen degrees and thirty degrees with respect to said wireless receiver.

4. The system of claim 1, and wherein:

said door is a swinging door with a horizontal hinge located at a top of the doorway, and wherein said robotic vehicle pushes said door open during passage through said door, and wherein said door returns to said closed position under force of gravity.

5. The system of claim 1, and wherein said locking mechanism further comprises:

a longitudinally translated pin positionable between a retracted position to unlock said door, and an extended position to lock said door, and wherein said longitudinally translated pin is retracted and extended by a solenoid or a motor.

6. The system of claim 1, and wherein:

said door is externally powered, and is rotatably or slidably moved out of the path of the robotic vehicle upon receipt of said electronic signal by said doorway device.

7. A method of controlling access to a separated area by a robotic vehicle through a barrier that has a doorway formed therethrough where a door is movably disposed within the doorway, between a closed position and an open position, and using a doorway device coupled to the barrier adjacent the door, having a wireless receiver coupled to a locking mechanism for selectively engaging and locking the door at the closed position, and wherein a magnet is disposed between the door and the doorway device, and wherein a Hall effect sensor positioned adjacent said door, and selectively unlocking the door in response to receiving the electronic signal, comprising the steps of:

moving the robotic vehicle toward the doorway device, thereby enabling communications of electronic signals to the wireless receiver;

transmitting an electronic signal from the robotic vehicle using a wireless transmitter;

unlocking the door by the unlocking mechanism in response to receiving the electronic signal, thereby enabling movement of the door to the open position;

passing the robotic vehicle through the doorway to the separated area;

returning the door to the closed position, and cooperatively assisting gravity, by the magnet, thereby to encouraging the door towards said closed position, and providing a position signal by the Hall effect sensor to confirm the door is at the closed position, and engaging and locking the door by the locking mechanism after the robotic vehicle as passed through the doorway.

8. The method of claim 7, further comprising the step of:

delaying a predetermined period of time prior to engaging and locking the door.

9. The method of claim 7, and wherein the electronic signal is an infrared signal having an effective range to five to ten feet, and further comprising the step of;

transmitting the electronic signal continuously.

10. The method of claim 7, and wherein:

the electronic signal comprises plural directional electronic signal, which have an angular orientation between fifteen degrees and thirty degrees with respect to the wireless receiver.

11. The method of claim 7, and wherein the door is a swinging door with a horizontal hinge located at a top of the doorway, and further comprising the steps of:

pushing the door open by the robotic vehicle while passing through the door, and returning the door to the closed position under force of gravity.

12. The method of claim 7, and wherein the locking mechanism includes a longitudinally translated pin positionable between a retracted position to unlock the door, and an extended position to lock the door, and further comprising the steps of:

retracting and extending the longitudinally translated pin using a solenoid or a motor.

* * * * *